(12) United States Patent
Wei et al.

(10) Patent No.: US 10,784,565 B2
(45) Date of Patent: Sep. 22, 2020

(54) MOBILE DEVICE AND ANTENNA STRUCTURE THEREIN

(71) Applicant: Wistron Corp., New Taipei (TW)

(72) Inventors: Wan Chu Wei, New Taipei (TW);
Hsieh Chih Lin, New Taipei (TW);
Yu-Chia Chang, New Taipei (TW);
Jung-Chin Hsieh, New Taipei (TW);
Wen-Chieh Wu, New Taipei (TW)

(73) Assignee: WISTRON CORP., New Taipei (TW)

( * ) Notice: Subject to any disclaimer, the term of this patent is extended or adjusted under 35 U.S.C. 154(b) by 120 days.

(21) Appl. No.: 16/112,443

(22) Filed: Aug. 24, 2018

(65) Prior Publication Data
US 2020/0014092 A1      Jan. 9, 2020

(30) Foreign Application Priority Data

Jul. 5, 2018   (TW) .............................. 107123302 A (51) Int. Cl.
| | |
|---|---|
| *H01Q 1/24* | (2006.01) |
| *H01Q 1/22* | (2006.01) |
| *H01Q 1/42* | (2006.01) |
| *H01Q 5/30* | (2015.01) |
| *H01Q 9/04* | (2006.01) |
| *H04M 1/02* | (2006.01) |

(52) U.S. Cl.
CPC ............ *H01Q 1/242* (2013.01); *H01Q 1/2266* (2013.01); *H01Q 1/42* (2013.01); *H01Q 5/30* (2015.01); *H01Q 9/0421* (2013.01); *H04M 1/0283* (2013.01)

(58) Field of Classification Search
CPC ........ H01Q 1/242; H01Q 1/42; H01Q 1/2266; H01Q 5/30; H01Q 9/0421; H01Q 9/0414; H01Q 5/378; H01Q 1/40; H01Q 1/2258; H01Q 1/36; H01Q 1/50; H01Q 1/526; H04M 1/0283
See application file for complete search history.

(56) References Cited

U.S. PATENT DOCUMENTS

| | | | | |
|---|---|---|---|---|
| 9,455,489 | B2 * | 9/2016 | Shiu .......................... | H01Q 1/24 |
| 9,843,092 | B2 | 12/2017 | Tu et al. | |
| 2013/0050032 | A1 * | 2/2013 | Shiu .......................... | H01Q 1/24 |
| | | | | 343/702 |

(Continued)

FOREIGN PATENT DOCUMENTS

TW           201739234 A        11/2017

*Primary Examiner* — Hai V Tran
*Assistant Examiner* — Michael M Bouizza (57) ABSTRACT

A mobile device includes a host upper cover, a host lower cover, a metal cavity structure, a protruding radiation element, a nonconductive connection element, and a feeding element. The metal cavity structure is coupled between the host upper cover and the host lower cover. The metal cavity structure includes a first metal partition and a second metal partition. The first metal partition has an opening. The nonconductive connection element is connected to the edge of the opening of the first metal partition. The nonconductive connection element is configured to support and surround the protruding radiation element. The feeding element is coupled to a signal source and is disposed adjacent to the protruding radiation element. An antenna structure is formed by the feeding element and the protruding radiation element.

18 Claims, 12 Drawing Sheets

(56) References Cited

U.S. PATENT DOCUMENTS

| | | | |
|---|---|---|---|
| 2014/0327584 A1 | 11/2014 | Chang | |
| 2015/0255851 A1* | 9/2015 | Guterman | H01Q 9/42 343/702 |
| 2018/0183137 A1* | 6/2018 | Tsai | H01Q 9/42 |
| 2019/0067796 A1* | 2/2019 | Lu | H01Q 1/44 |
| 2019/0356051 A1* | 11/2019 | Barrera | H01Q 1/2266 |

* cited by examiner

MOBILE DEVICE AND ANTENNA STRUCTURE THEREIN

CROSS REFERENCE TO RELATED APPLICATIONS

This application claims priority of Taiwan Patent Application No. 107123302 filed on Jul. 5, 2018, the entirety of which is incorporated by reference herein.

BACKGROUND OF THE INVENTION

Field of the Invention

The disclosure generally relates to a mobile device, and more particularly, to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, the newly added metal elements tend to negatively affect the operation of antennas used for wireless communication in mobile devices, thereby degrading the overall communication quality of the mobile devices. As a result, there is a need to propose a mobile device with a novel antenna structure, so as to overcome the problems of the prior art.

BRIEF SUMMARY OF THE INVENTION

In a preferred embodiment, the invention is directed to a mobile device including a host upper cover, a host lower cover, a metal cavity structure, a protruding radiation element, a nonconductive connection element, and a feeding element. The metal cavity structure is coupled between the host upper cover and the host lower cover. The metal cavity structure includes a first metal partition and a second metal partition. The first metal partition has an opening. The nonconductive connection element is connected to the edge of the opening of the first metal partition. The nonconductive connection element is configured to support and surround the protruding radiation element. The feeding element is coupled to a signal source and is disposed adjacent to the protruding radiation element. An antenna structure is formed by the feeding element and the protruding radiation element.

In some embodiments, the host upper cover and the host lower cover are made of metal materials.

In some embodiments, the metal cavity structure is adjacent to the edge of the host upper cover and the edge of the host lower cover.

In some embodiments, the first metal partition is aligned with the edge of the host upper cover and the edge of the host lower cover.

In some embodiments, the protruding radiation element and the first metal partition are positioned on two different planes which are substantially parallel to each other, respectively.

In some embodiments, the protruding radiation element has a vertical projection on the first metal partition, and the vertical projection is completely inside the opening.

In some embodiments, the protruding radiation element substantially has a straight-line shape.

In some embodiments, the feeding element substantially has a straight-line shape or an L-shape.

In some embodiments, the antenna structure covers a first frequency band from 2400 MHz to 2500 MHz, and a second frequency band from 5150 MHz to 5850 MHz.

In some embodiments, the mobile device further includes a transmission line. The signal source is coupled through the transmission line to the feeding element.

In some embodiments, the transmission line is a microstrip line.

In some embodiments, the mobile device further includes a dielectric substrate. The feeding element and the transmission line are disposed on the dielectric substrate.

In some embodiments, the dielectric substrate has a right-angle bending portion.

In some embodiments, a coupling gap is formed between the feeding element and the protruding radiation element.

In some embodiments, the length of the protruding radiation element is substantially equal to 0.4 wavelength of the first frequency band.

In some embodiments, the protruding radiation element is excited to generate a fundamental resonant mode forming the first frequency band, and the protruding radiation element is further excited to generate a higher-order resonant mode forming the second frequency band.

In some embodiments, the mobile device further includes a via conductor penetrating the dielectric substrate. The feeding element is coupled through the via conductor to a feeding point on the protruding radiation element.

In some embodiments, transmission line includes a signaling conductor and a grounding conductor, and the grounding conductor is coupled to a shorting point on the protruding radiation element.

In some embodiments, the length of the protruding radiation element is substantially equal to 0.25 wavelength of the first frequency band.

In some embodiments, the protruding radiation element includes a first portion and a second portion. The feeding point is positioned between the first portion and the second portion. The first portion is excited to generate the first frequency band, and the second portion is excited to generate the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
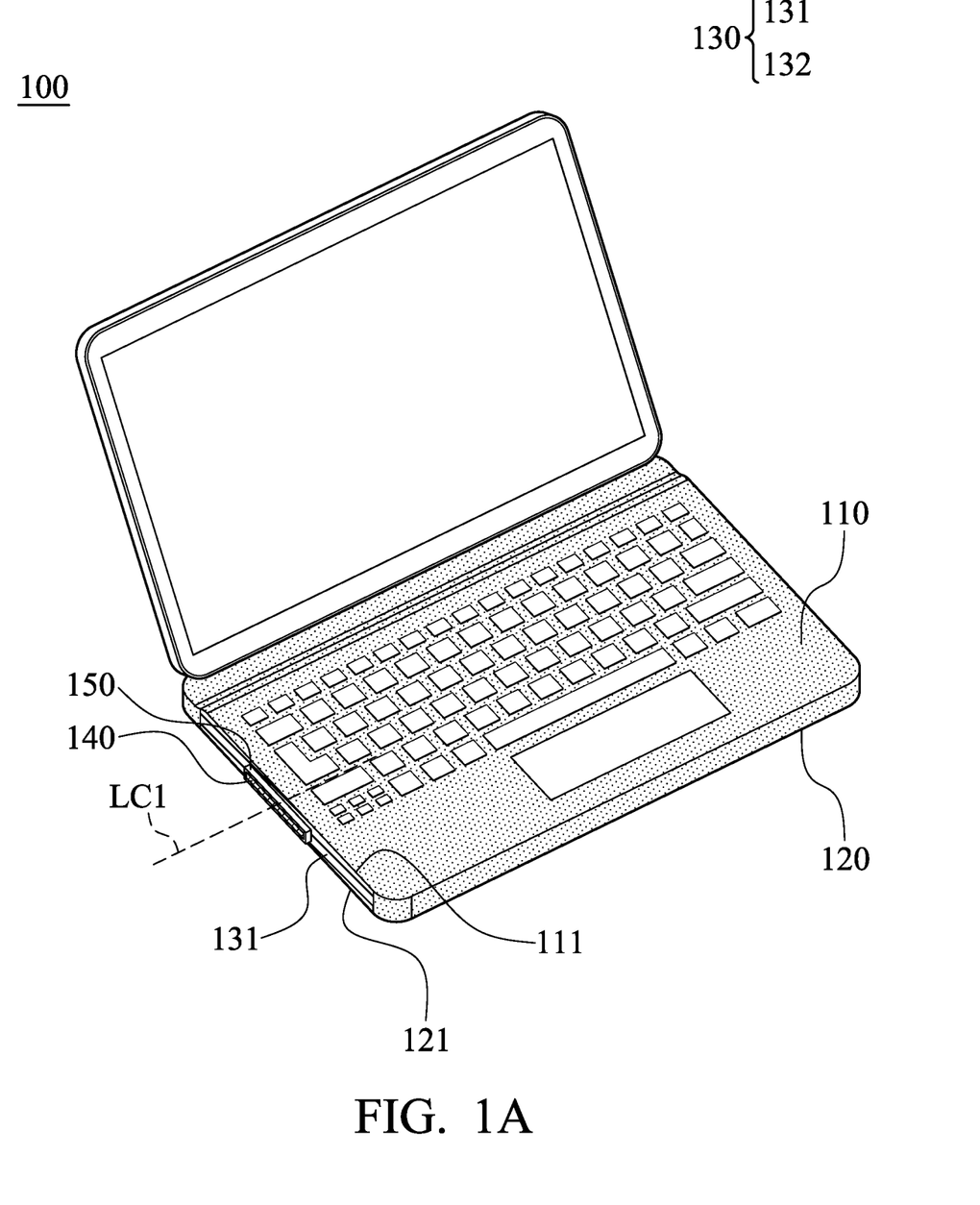
FIG. 1A is a perspective view of a mobile device according to an embodiment of the disclosure.
Figure 1B:
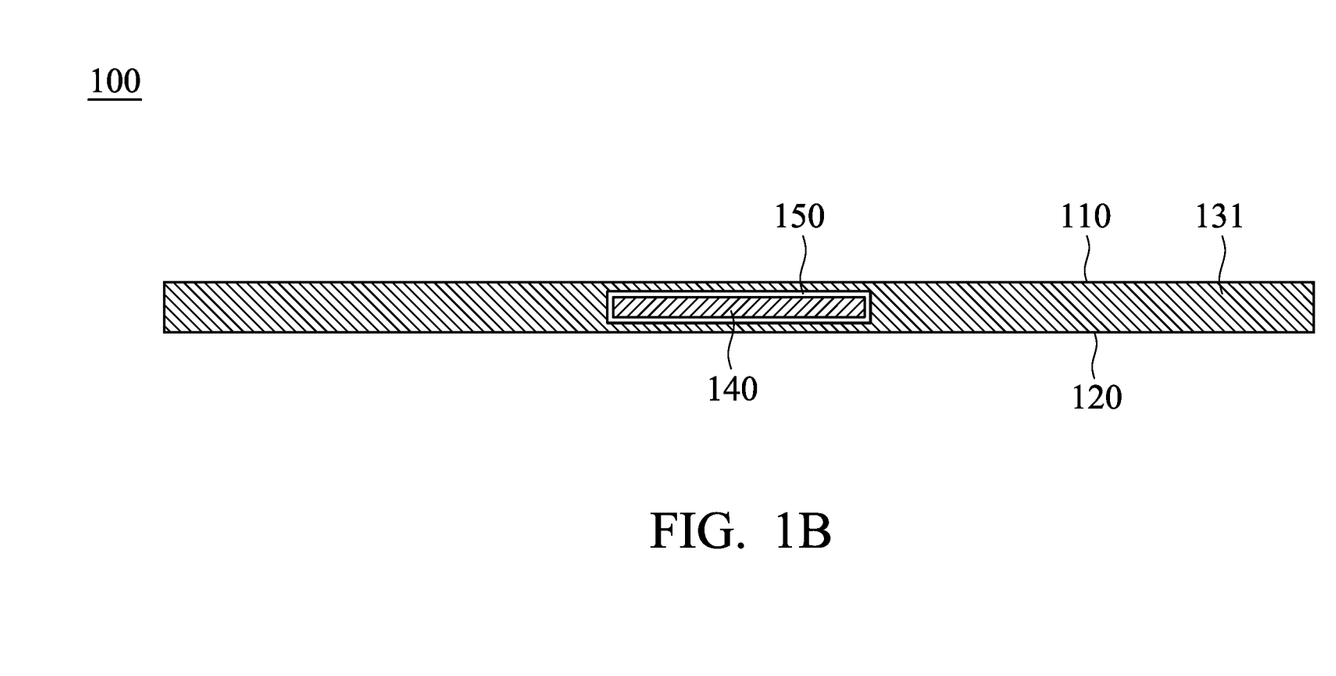
FIG. 1B is a side view of a mobile device according to an embodiment of the disclosure.
Figure 1C:
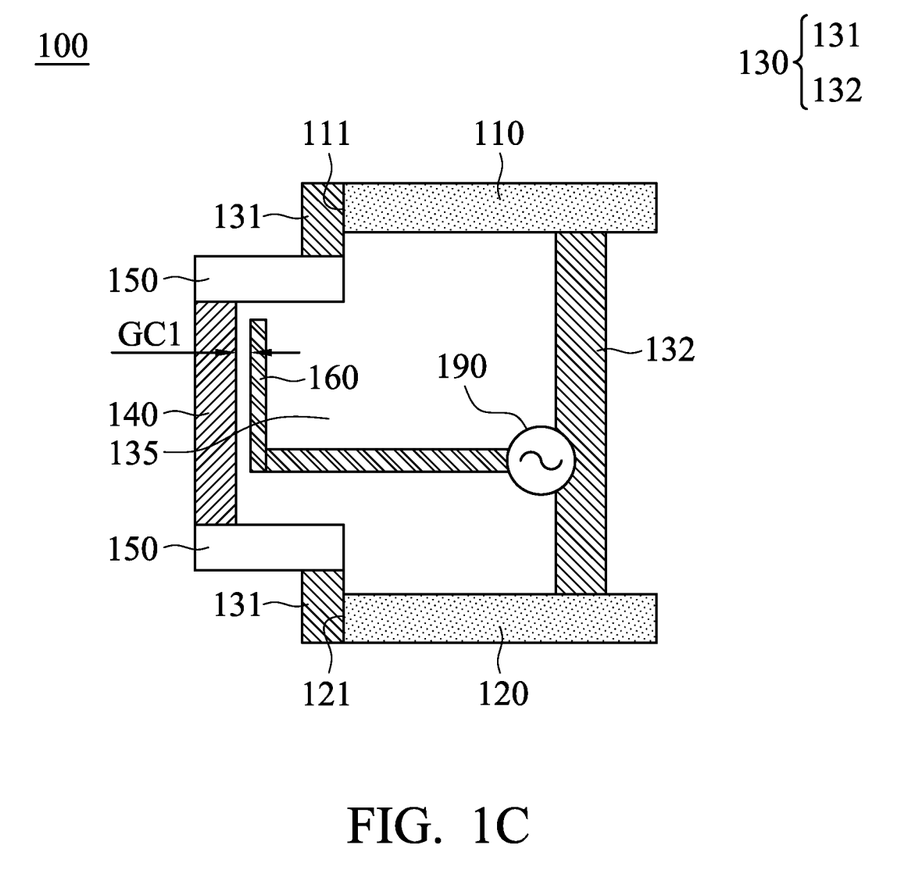
FIG. 1C is a sectional view of a mobile device according to an embodiment of the disclosure.

FIG. 1A is a perspective view of a mobile device 100 according to an embodiment of the disclosure. FIG. 1B is a side view of the mobile device 100 according to an embodiment of the disclosure. FIG. 1C is a sectional view of the mobile device 100 (along a sectional line LC1 of FIG. 1A) according to an embodiment of the disclosure. Please refer to FIG. 1A, FIG. 1B, and FIG. 1C together. The mobile device 100 may be a notebook computer. As shown in FIG. 1A, FIG. 1B, and FIG. 1C, the mobile device 100 includes a host upper cover 110, a host lower cover 120, a metal cavity structure 130, a protruding radiation element 140, a nonconductive connection element 150, and a feeding element 160. In addition, the mobile device 100 further includes a back cover and a display frame. It should be noted that the back cover, the display frame, the host upper cover 110, and the host lower cover 120 are equivalent to the so-called "A component", "B-component", "C-component", and "D-component" in the technical field of notebook computers, respectively. In other embodiments, the mobile device 100 further includes other components, such as a processor, a storage device, and a battery module, although they are not displayed in FIG. 1A, FIG. 1B, and FIG. 1C.

The host upper cover 110, the host lower cover 120, the protruding radiation element 140, and the feeding element 160 is each at least partially or completely made of a metal material. The metal cavity structure 130 is directly coupled between the host upper cover 110 and the host lower cover 120. For example, the metal cavity structure 130 may be adjacent to an edge 111 of the host upper cover 110 and an edge 121 of the host lower cover 120. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing therebetween is reduced to 0).

In some embodiments, the metal cavity structure 130 includes a first metal partition 131 and a second metal partition 132. The first metal partition 131 is positioned between the edge 111 of the host upper cover 110 and the edge 121 of the host lower cover 120. The first metal partition 131 is aligned with the edge 111 of the host upper cover 110 and the edge 121 of the host lower cover 120. A hollow portion of the metal cavity structure 130 may be surrounded by the host upper cover 110, the host lower cover 120, the first metal partition 131, and the second metal partition 132. The shape of the hollow portion is not limited in the disclosure. For example, the hollow portion of the metal cavity structure 130 may be substantially a cuboid. However, in other embodiments, the hollow portion of the metal cavity structure 130 may be substantially a triangular cylinder or a half cylinder, without affecting the performance of the disclosure.

The first metal partition 131 has an opening 135. The opening 135 may substantially have a rectangular shape or a straight-line shape. The nonconductive connection element 150 may be made of a plastic material or an insulator material. The nonconductive connection element 150 is connected to the edge of the opening 135 of the first metal partition 131. The nonconductive connection element 150 is configured to support and surround the protruding radiation element 140. The protruding radiation element 140 may substantially have a rectangular shape or a straight-line shape. Specifically, because the protruding radiation element 140 is supported by the nonconductive connection element 150, the protruding radiation element 140 and the first metal partition 131 are positioned on two different planes which are substantially parallel to each other, respectively. The protruding radiation element 140 has a vertical projection on the first metal partition 131, and the vertical projection is completely inside the opening 135 of the first metal partition 131.

The feeding element 160 may be an independent ironware element, or a metal trace disposed on a PCB (Printed Circuit Board) or an FCB (Flexible Circuit Board). The feeding element 160 is disposed adjacent to the protruding radiation element 140. An antenna structure is formed by the feeding element 160 and the protruding radiation element 140. In some embodiments, the feeding element 160 substantially has an L-shape or a straight-line shape. The feeding element 160 is coupled to a signal source 190, such as an RF (Radio Frequency) module. The feeding element 160 is configured to directly or indirectly excite the aforementioned antenna structure. For example, a coupling gap GC1 may be formed between the feeding element 160 and the protruding radiation element 140, such that the aforementioned antenna structure can be excited by the feeding element 160 using a coupling mechanism.

In some embodiments, the antenna structure of the mobile device 100 can cover a first frequency band from 2400 MHz to 2500 MHz, and a second frequency band from 5150 MHz to 5850 MHz. Accordingly, the mobile device 100 can support at least the dual-band operations of WLAN (Wireless Local Area Networks) 2.4 GHz/5 GHz.

According to antenna theory, the protruding radiation element 140 is considered the main radiator of the antenna structure of the mobile device 100. Since the protruding radiation element 140 is not disposed inside the mobile device 100 and the metal cavity structure 130 has the function of shielding electromagnetic waves, this design can prevent the antenna structure from being interfered with by other metal elements or electronic components of the mobile device 100. The protruding radiation element 140 may be integrated with an appearance element of the mobile device 100, such as a volume button. In addition, the metal cavity structure 130 is used as an energy reflective plane relative to the antenna structure, thereby enhancing the radiation gain of the antenna structure.

Figure 2A:
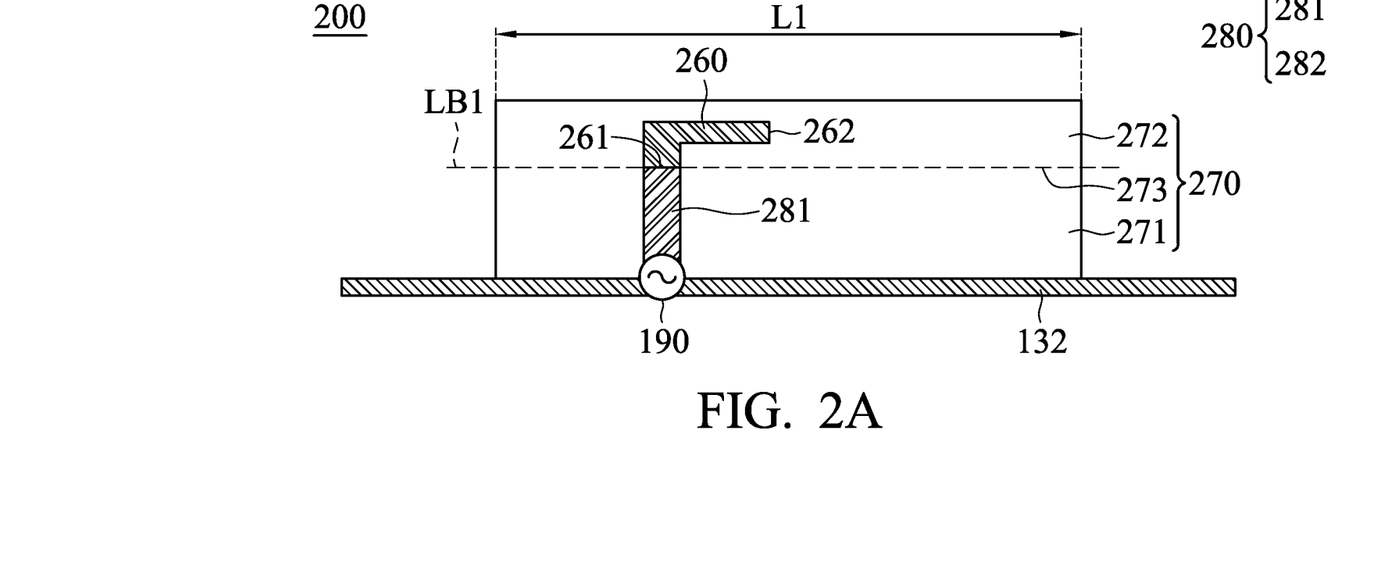
FIG. 2A is a partial expanded view of a mobile device according to an embodiment of the disclosure.
Figure 2B:
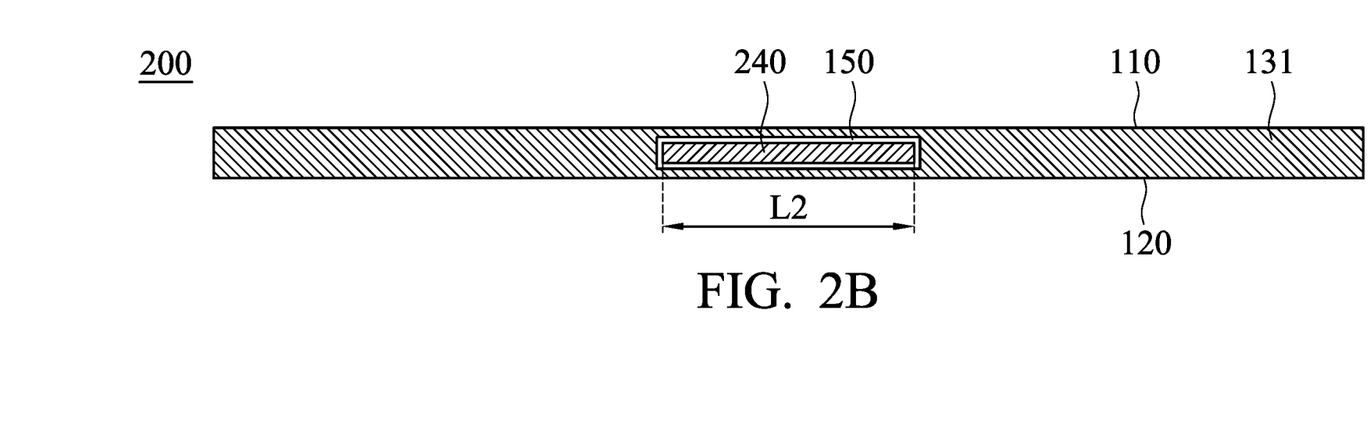
FIG. 2B is a side view of a mobile device according to an embodiment of the disclosure.
Figure 2C:
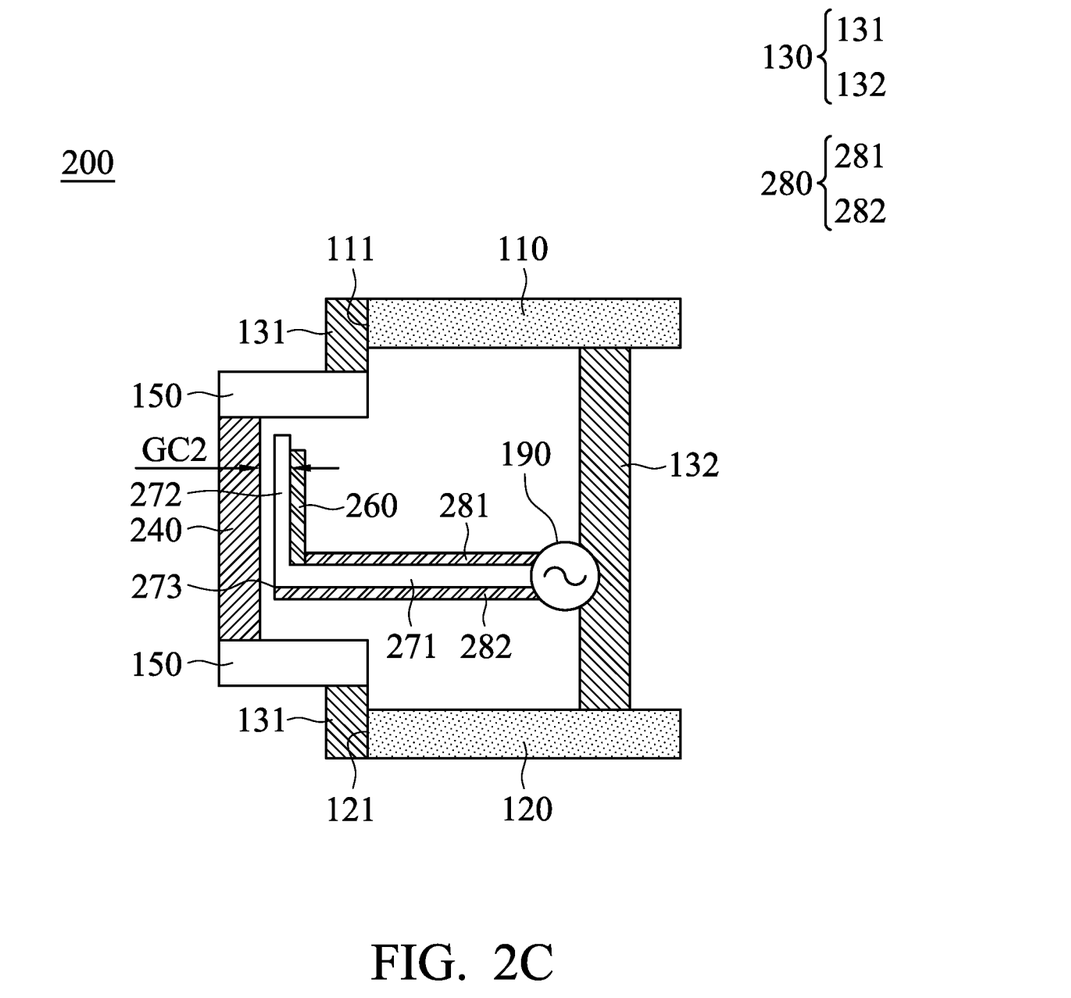
FIG. 2C is a sectional view of a mobile device according to an embodiment of the disclosure.

FIG. 2A is a partial expanded view of a mobile device 200 according to an embodiment of the disclosure. FIG. 2B is a side view of the mobile device 200 according to an embodiment of the disclosure. FIG. 2C is a sectional view of the mobile device 200 according to an embodiment of the disclosure. Please refer to FIG. 2A, FIG. 2B, and FIG. 2C together. FIG. 2A, FIG. 2B, and FIG. 2C are similar to FIG. 1A, FIG. 1B, and FIG. 1C. In the embodiment of FIG. 2A, FIG. 2B, and FIG. 2C, the mobile device 200 includes a host upper cover 110, a host lower cover 120, a metal cavity structure 130, a protruding radiation element 240, a nonconductive connection element 150, a feeding element 260, a dielectric substrate 270, and a transmission line 280. The functions and arrangements of the host upper cover 110, the host lower cover 120, the metal cavity structure 130, and the nonconductive connection element 150 have been described in the embodiment of FIG. 1A, FIG. 1B, and FIG. 1C.

An antenna structure of the mobile device 200 is formed by the protruding radiation element 240 and the feeding element 260. The signal source 190 is coupled through the transmission line 280 to the feeding element 260. The type of the transmission line 280 is not limited in the disclosure. For example, the transmission line 280 may be a coaxial cable or a microstrip line. The feeding element 260 may substantially have an L-shape. The feeding element 260 has a first end 261 and a second end 262. The first end 261 of the feeding element 260 is coupled to the transmission line 280. The second end 262 of the feeding element 260 is an open end. The dielectric substrate 270 may be a PCB or an FCB. The feeding element 260 and the transmission line 280 may be both disposed on the dielectric substrate 270. Specifically, the dielectric substrate 270 includes a first portion 271, a second portion 272, and a right-angle bending portion 273 (bent by 90 degrees along a bending line LB1 of FIG. 2A).

The right-angle bending portion 273 is connected between the first portion 271 and the second portion 272. The feeding element 260 is positioned on the second portion 272 of the dielectric substrate 270 and is adjacent to the protruding radiation element 240. A coupling gap GC2 is formed between the feeding element 260 and the protruding radiation element 240. The transmission line 280 includes a signaling conductor 281 and a grounding conductor 282. The signaling conductor 281 and the grounding conductor 282 are positioned on two opposite surfaces of the first portion 271 of the dielectric substrate 270, respectively, so as to form a microstrip line. For example, a positive electrode of the signal source 190 may be coupled through the signaling conductor 281 to the first end 261 of the transmission line 260, and a negative electrode of the signal source 190 may be coupled to the grounding conductor 282.

Figure 2D:
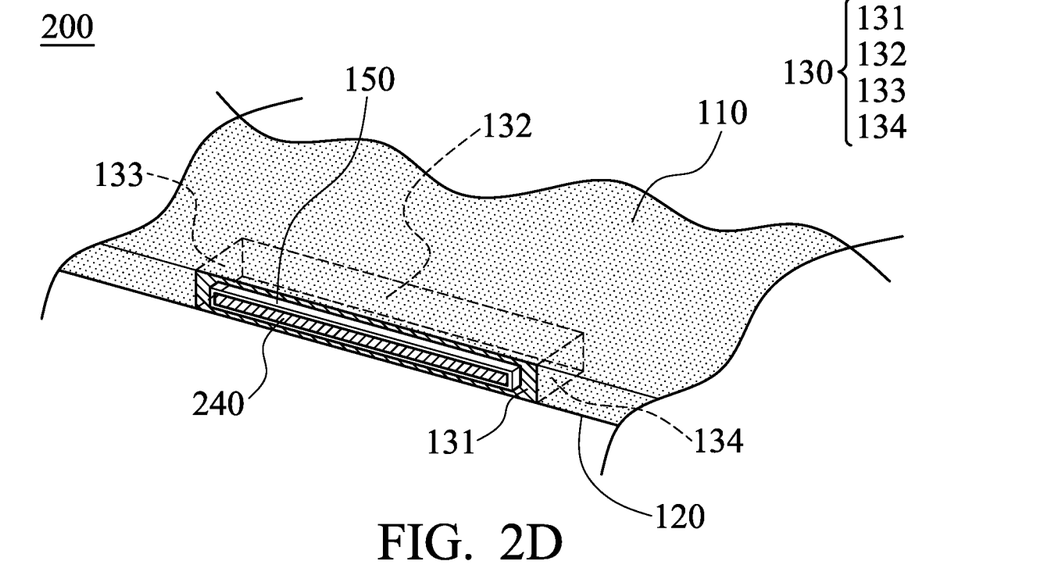
FIG. 2D is a partial perspective view of a mobile device according to an embodiment of the disclosure.

FIG. 2D is a partial perspective view of the mobile device 200 according to an embodiment of the disclosure. In the embodiment of FIG. 2D, the metal cavity structure 130 of the mobile device 200 further includes a first metal partition 133 and a second metal partition 134. The hollow portion of the metal cavity structure 130 is surrounded by the first metal partition 131, the second metal partition 132, the third metal partition 133, and the fourth metal partition 134. It should be noted that the total number of the aforementioned metal partitions and their positions are not limited in the disclosure.

Figure 2E:
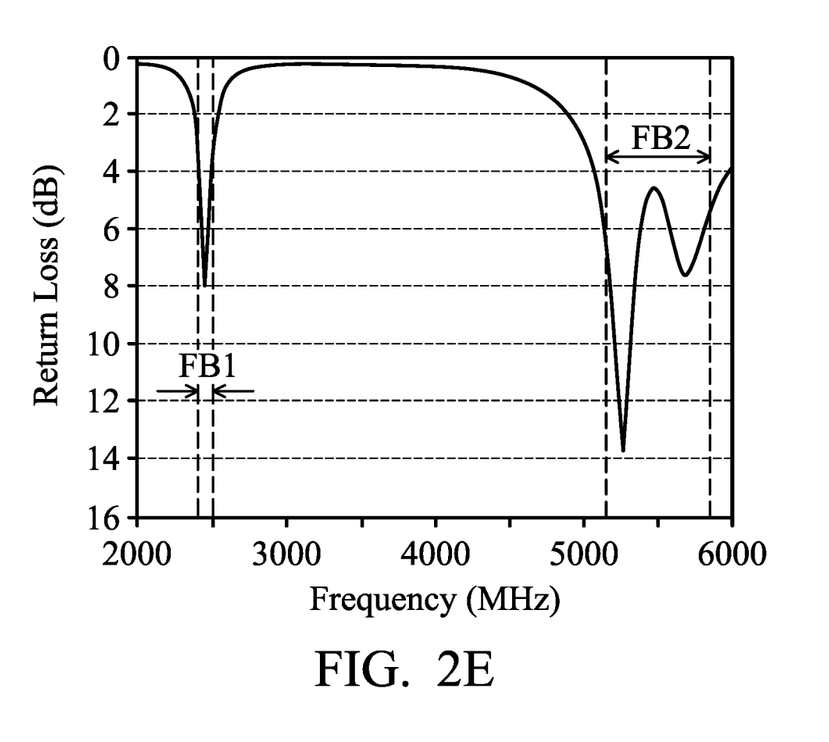
FIG. 2E is a diagram of return loss of an antenna structure of a mobile device according to an embodiment of the disclosure.

FIG. 2E is a diagram of return loss of the antenna structure of the mobile device 200 according to an embodiment of the disclosure. According to the measurement of FIG. 2E, the antenna structure of the mobile device 200 can cover a first frequency band FB1 from 2400 MHz to 2500 MHz, and a second frequency band FB2 from 5150 MHz to 5850 MHz. According to practical measurements, the radiation efficiency of the antenna structure of the mobile device 200 is about 74% or higher within the first frequency band FB1, and the radiation efficiency of the antenna structure of the mobile device 200 is about 84% or higher within the second frequency band FB2.

According to antenna theory, the protruding radiation element 240 can be excited to generate a fundamental resonant mode forming the first frequency band FB1, and the protruding radiation element 240 can be further excited to generate a higher-order resonant mode forming the second frequency band FB2 (double-frequency effect). In addition, the feeding element 260 can be independently excited to increase the operation bandwidth of the second frequency band FB2.

The element sizes of the mobile device 200 may be as follows. The length L1 of the dielectric substrate 270 may be substantially equal to 0.4 wavelength of the first frequency band FB1. The length L2 of the protruding radiation element 240 may be substantially equal to 0.4 wavelength of the first frequency band FB1. The width of the coupling gap GC2 may be shorter than 0.5 mm (e.g., 0.4 mm). The length of the feeding element 260 (e.g., the length from the first end 261 to the second end 262) may be substantially equal to 0.15 wavelength of the first frequency band FB1. The above ranges of element sizes are calculated and obtained according to many experiment results, and they help to optimize the operation bandwidth and the impedance matching of the antenna structure of the mobile device 200. Other features of the mobile device 200 of FIG. 2A, FIG. 2B, FIG. 2C, and FIG. 2D are similar to those of the mobile device 100 of FIG. 1A, FIG. 1B, and FIG. 1C. Therefore, the two embodiments can achieve similar levels of performance.

Figure 3A:
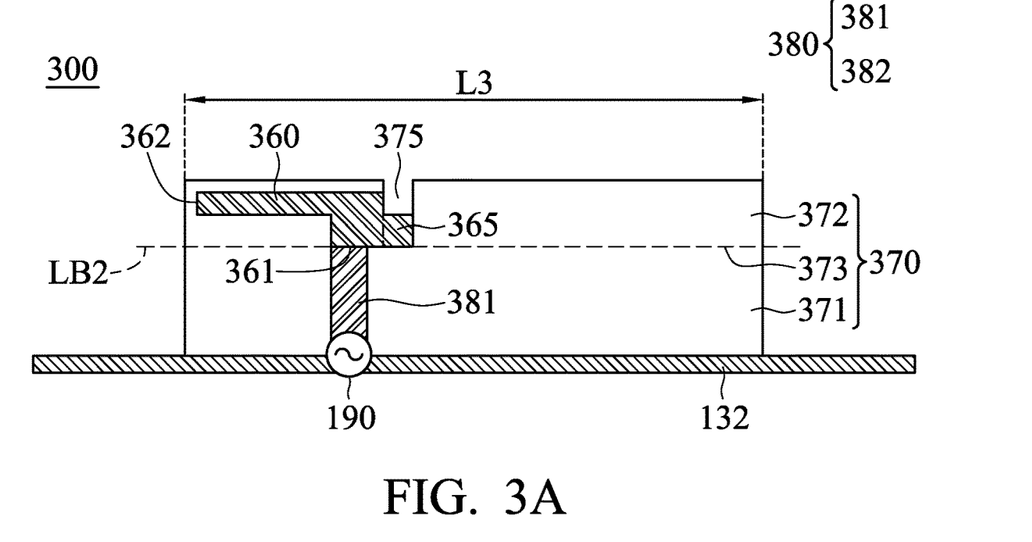
FIG. 3A is a partial expanded view of a mobile device according to another embodiment of the disclosure.
Figure 3B:
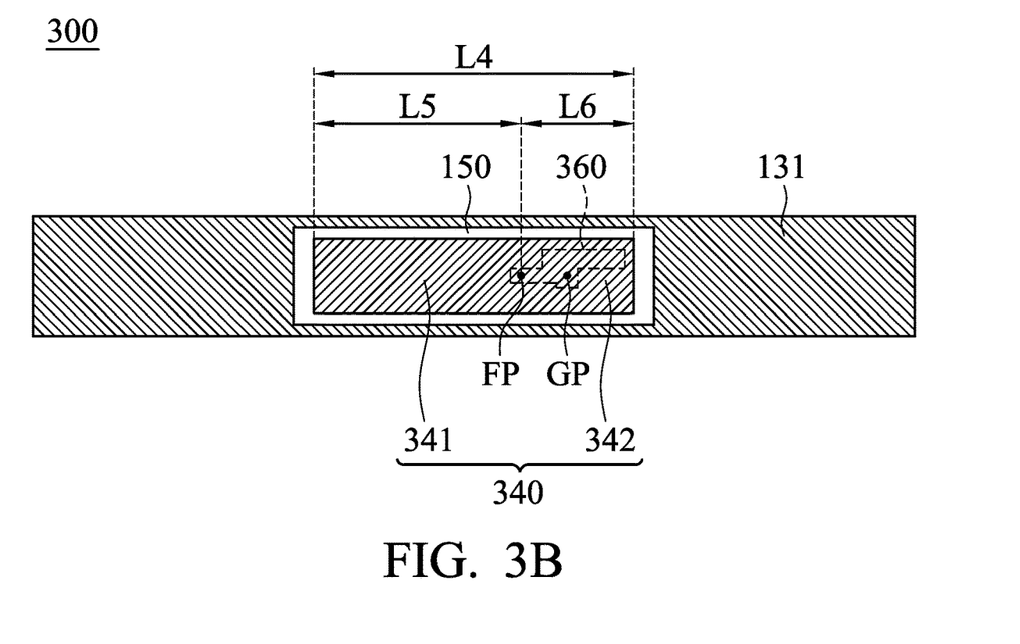
FIG. 3B is a side view of a mobile device according to another embodiment of the disclosure.
Figure 3C:
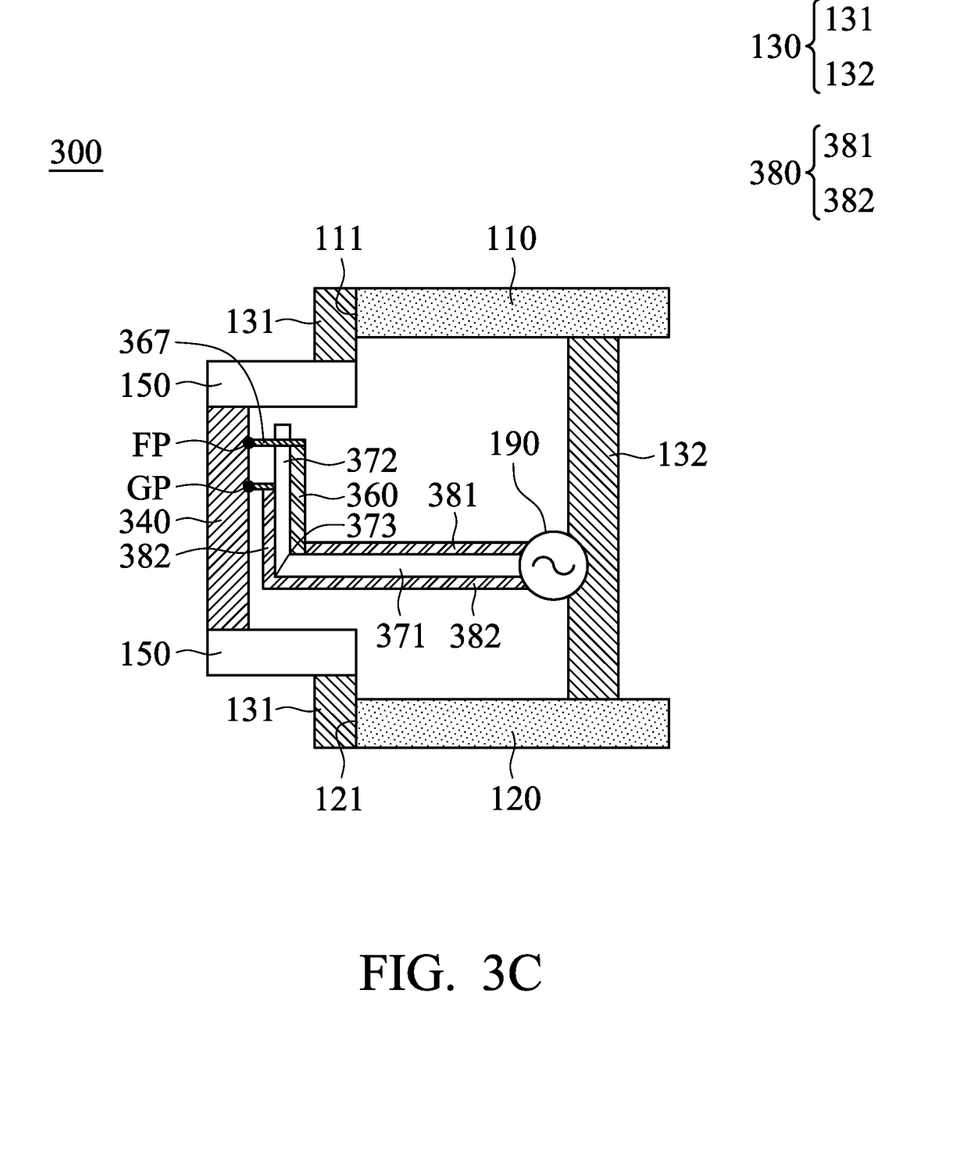
FIG. 3C is a sectional view of a mobile device according to another embodiment of the disclosure.

FIG. 3A is a partial expanded view of a mobile device 300 according to another embodiment of the disclosure. FIG. 3B is a side view of the mobile device 300 according to another embodiment of the disclosure. FIG. 3C is a sectional view of the mobile device 300 according to another embodiment of the disclosure. Please refer to FIG. 3A, FIG. 3B, and FIG. 3C together. FIG. 3A, FIG. 3B, and FIG. 3C are similar to FIG. 1A, FIG. 1B, and FIG. 1C. In the embodiment of FIG. 3A, FIG. 3B, and FIG. 3C, the mobile device 300 includes a host upper cover 110, a host lower cover 120, a metal cavity structure 130, a protruding radiation element 340, a nonconductive connection element 150, a feeding element 360, a via conductor 367, a dielectric substrate 370, and a transmission line 380. The functions and arrangements of the host upper cover 110, the host lower cover 120, the metal cavity structure 130, and the nonconductive connection element 150 have been described in the embodiment of FIG. 1A, FIG. 1B, and FIG. 1C.

An antenna structure of the mobile device 300 is formed by the protruding radiation element 340 and the feeding element 360. The signal source 190 is coupled through the transmission line 380 to the feeding element 360. The type of the transmission line 380 is not limited in the disclosure. For example, the transmission line 380 may be a coaxial cable or a microstrip line. The feeding element 360 may substantially have an L-shape. The feeding element 360 has a first end 361 and a second end 362. The first end 361 of the feeding element 360 is coupled to the transmission line 380. The second end 362 of the feeding element 360 is an open end. The feeding element 360 may further include an additional portion 365. The additional portion 365 may substantially have a rectangular shape. The additional portion 365 and the second end 362 of the feeding element 360 may substantially extend in opposite directions. The dielectric substrate 370 may be a PCB or an FCB. The feeding element 360 and the transmission line 380 may be both disposed on the dielectric substrate 370. Specifically, the dielectric substrate 370 includes a first portion 371, a second portion 372, and a right-angle bending portion 373 (bent by 90 degrees along a bending line LB2 of FIG. 3A). The right-angle bending portion 373 is connected between the first portion 371 and the second portion 372. The feeding element 360 is positioned on the second portion 372 of the dielectric substrate 370 and is adjacent to the protruding radiation element 340. The via conductor 367 penetrates the second portion 372 of the dielectric substrate 370. The additional portion 365 of the feeding element 360 is coupled through the via conductor 367 to a feeding point FP on the protruding radiation element 340. The second portion 372 of the dielectric substrate 370 may further have a notch 375. The notch 375 may substantially have a rectangular shape and may be adjacent to the additional portion 365 of the feeding element 360. The transmission line 380 includes a signaling conductor 381 and a grounding conductor 382. The signaling conductor 381 and the grounding conductor 382 are positioned on two opposite surfaces of the first portion 371 of the dielectric substrate 370, respectively. A positive electrode of the signal source 190 may be coupled through the signaling conductor 381 to the first end 361 of the transmission line 360, and a negative electrode of the signal source 190 may be coupled to the grounding conductor 382. The grounding conductor 382 may further extend onto the second portion 372 of the dielectric substrate 370, and the grounding conductor 382 may be coupled to a shorting point GP on the protruding radiation element 340.

Figure 3D:
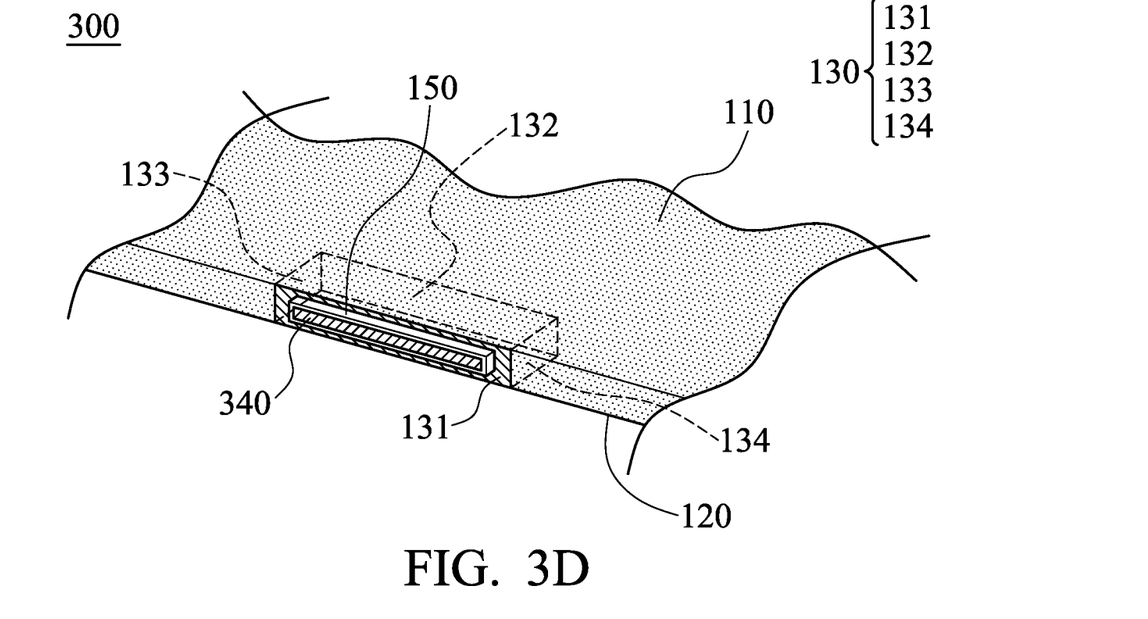
FIG. 3D is a partial perspective view of a mobile device according to another embodiment of the disclosure.

FIG. 3D is a partial perspective view of the mobile device 300 according to another embodiment of the disclosure. In the embodiment of FIG. 3D, the metal cavity structure 130 of the mobile device 300 further includes a first metal partition 133 and a second metal partition 134. The hollow portion of the metal cavity structure 130 is surrounded by the first metal partition 131, the second metal partition 132, the third metal partition 133, and the fourth metal partition 134. It should be noted that the total number of the aforementioned metal partitions and their positions are not limited in the disclosure.

Figure 3E:
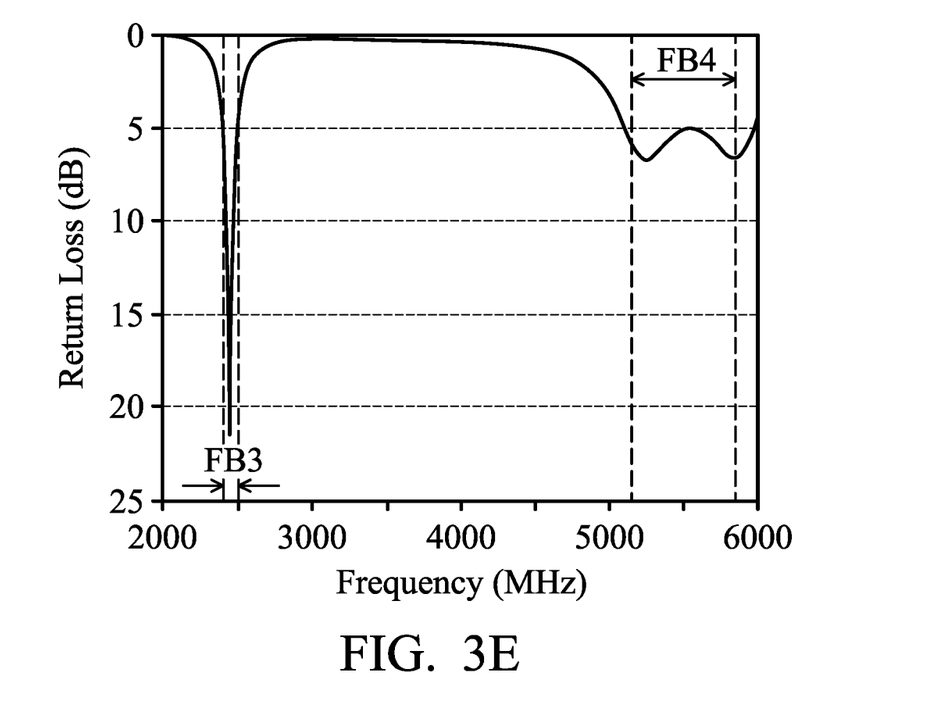
FIG. 3E is a diagram of return loss of an antenna structure of a mobile device according to another embodiment of the disclosure.

FIG. 3E is a diagram of return loss of the antenna structure of the mobile device 300 according to another embodiment of the disclosure. According to the measurement of FIG. 3E, the antenna structure of the mobile device 300 can cover a first frequency band FB3 from 2400 MHz to 2500 MHz, and a second frequency band FB4 from 5150 MHz to 5850 MHz. According to practical measurements, the radiation efficiency of the antenna structure of the mobile device 300 is about 83% or higher within the first frequency band FB3, and the radiation efficiency of the antenna structure of the mobile device 300 is about 70% or higher within the second frequency band FB4.

According to antenna theory, the protruding radiation element 340 is substantially divided into a longer first portion 341 and a shorter second portion 342, and the first portion 341 and the second portion 342 are positioned at a left side and a right side of the feeding point FP, respectively. That is, the feeding point FP is positioned between the first portion 341 and the second portion 342 of the protruding radiation element 340. The first portion 341 of the protruding radiation element 340 can be excited to generate the first frequency band FB3. The second portion 342 of the protruding radiation element 340 can be excited to generate the second frequency band FB4. In addition, the feeding element 360 can be independently excited to fine-tune the impedance matching of the antenna structure. According to practical measurement, such a directly-feeding design can help to increase the low-frequency radiation efficiency of the antenna structure of the mobile device 300 and to reduce the total size of the protruding radiation element 340.

The element sizes of the mobile device 300 may be as follows. The length L3 of the dielectric substrate 370 may be substantially equal to 0.25 wavelength of the first frequency band FB3. The length L4 of the protruding radiation element 340 may be substantially equal to 0.25 wavelength of the first frequency band FB3. The length L5 of the first portion 341 of the protruding radiation element 340 may be substantially equal to 0.17 wavelength of the first frequency band FB3. The length L6 of the second portion 342 of the protruding radiation element 340 may be substantially equal to 0.17 wavelength of the second frequency band FB4. The above ranges of element sizes are calculated and obtained according to many experiment results, and they help to optimize the operation bandwidth and the impedance matching of the antenna structure of the mobile device 300. Other features of the mobile device 300 of FIG. 3A, FIG. 3B, FIG. 3C, and FIG. 3D are similar to those of the mobile device 100 of FIG. 1A, FIG. 1B, and FIG. 1C. Therefore, the two embodiments can achieve similar levels of performance.

Figure 4A:
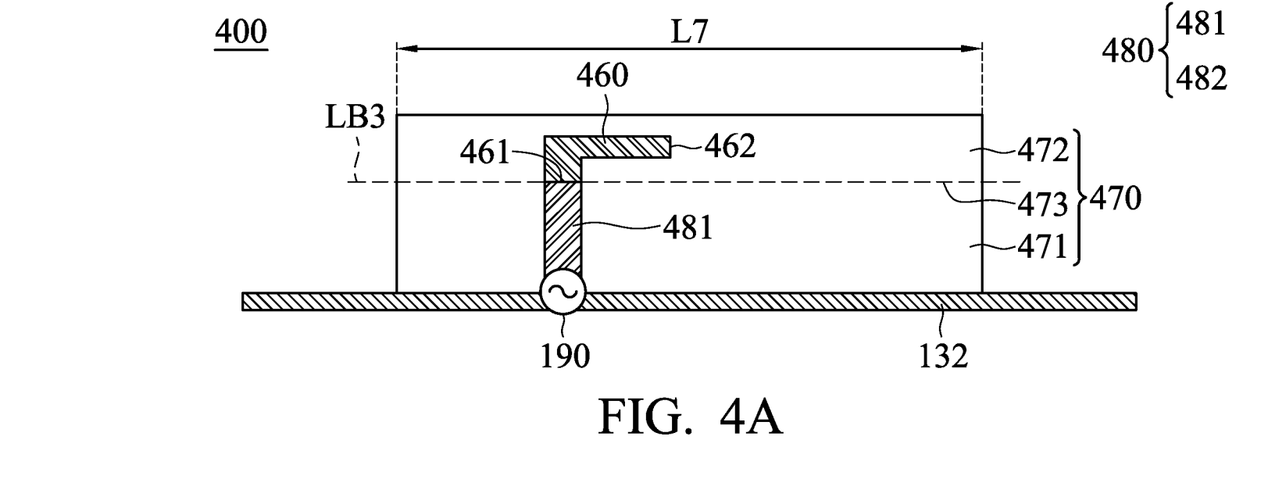
FIG. 4A is a partial expanded view of a mobile device according to an embodiment of the disclosure.
Figure 4B:
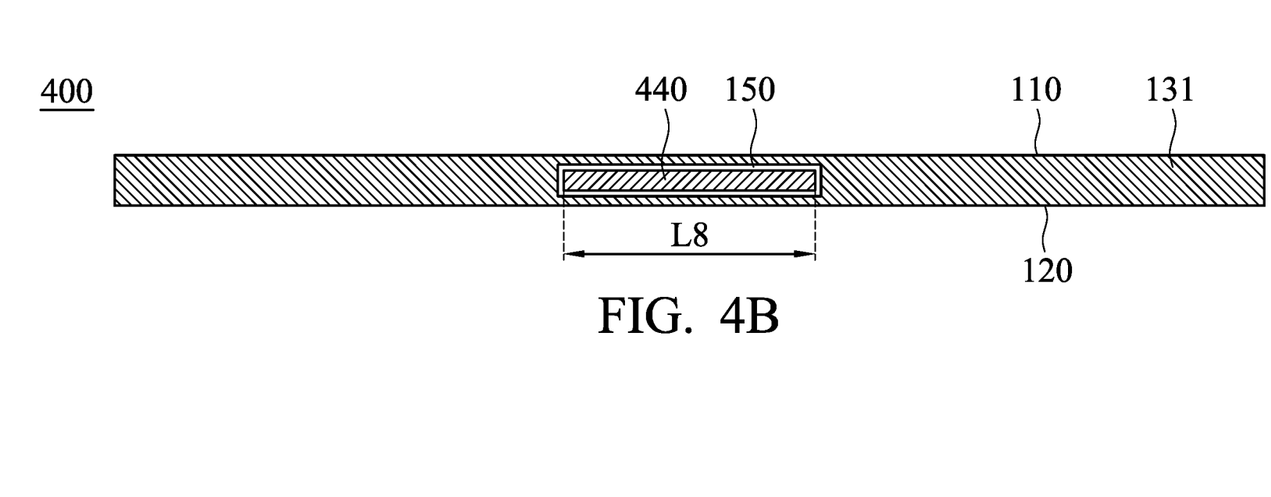
FIG. 4B is a side view of a mobile device according to an embodiment of the disclosure.
Figure 4C:
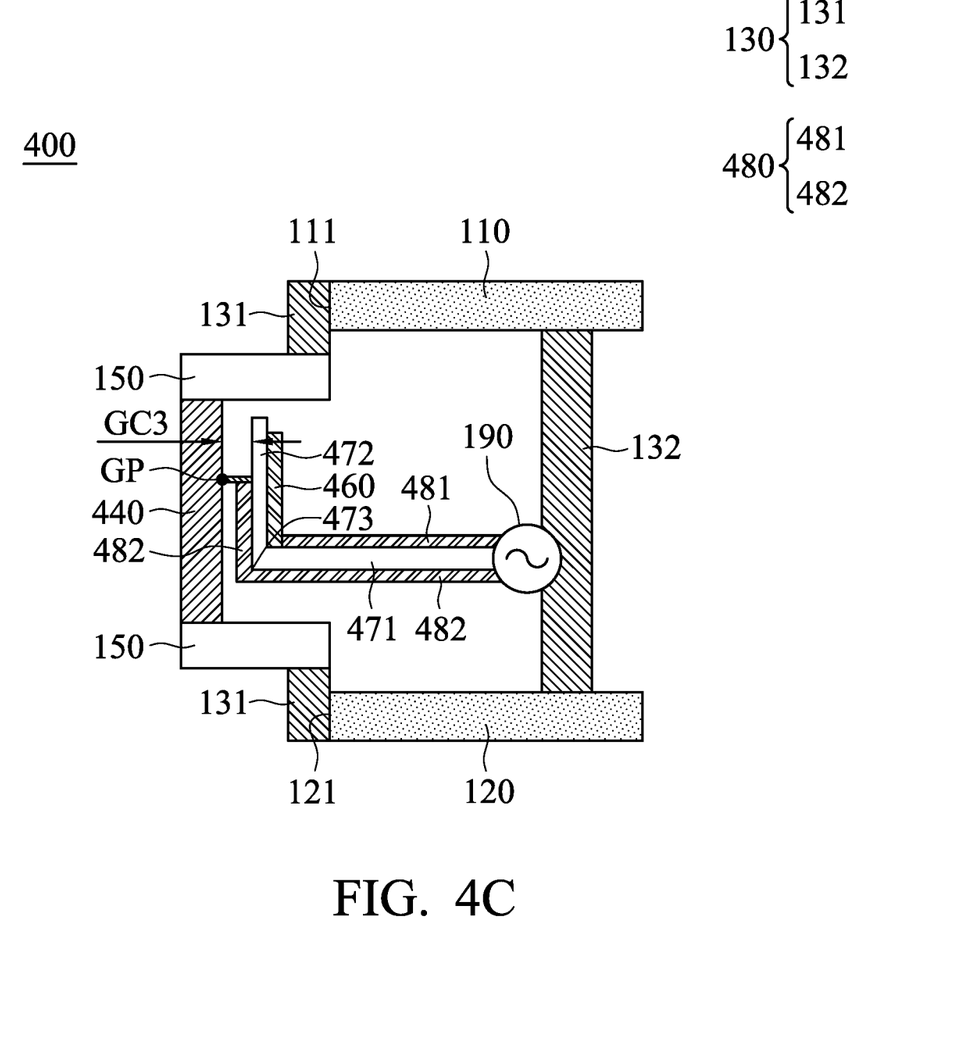
FIG. 4C is a sectional view of a mobile device according to an embodiment of the disclosure.

FIG. 4A is a partial expanded view of a mobile device 400 according to an embodiment of the disclosure. FIG. 4B is a side view of the mobile device 400 according to an embodiment of the disclosure. FIG. 4C is a sectional view of the mobile device 400 according to an embodiment of the disclosure. Please refer to FIG. 4A, FIG. 4B, and FIG. 4C together. FIG. 4A, FIG. 4B, and FIG. 4C are similar to FIG. 1A, FIG. 1B, and FIG. 1C. In the embodiment of FIG. 4A, FIG. 4B, and FIG. 4C, the mobile device 400 includes a host upper cover 110, a host lower cover 120, a metal cavity structure 130, a protruding radiation element 440, a nonconductive connection element 150, a feeding element 460, a dielectric substrate 470, and a transmission line 480. The functions and arrangements of the host upper cover 110, the host lower cover 120, the metal cavity structure 130, and the nonconductive connection element 150 have been described in the embodiment of FIG. 1A, FIG. 1B, and FIG. 1C.

An antenna structure of the mobile device 400 is formed by the protruding radiation element 440 and the feeding element 460. The signal source 190 is coupled through the transmission line 480 to the feeding element 460. The type of the transmission line 480 is not limited in the disclosure. For example, the transmission line 480 may be a coaxial cable or a microstrip line. The feeding element 460 may substantially have an L-shape. The feeding element 460 has a first end 461 and a second end 462. The first end 461 of the feeding element 460 is coupled to the transmission line 480. The second end 462 of the feeding element 460 is an open end. The dielectric substrate 470 may be a PCB or an FCB. The feeding element 460 and the transmission line 480 may be both disposed on the dielectric substrate 470. Specifically, the dielectric substrate 470 includes a first portion 471, a second portion 472, and a right-angle bending portion 473 (bent by 90 degrees along a bending line LB3 of FIG. 4A). The right-angle bending portion 473 is connected between the first portion 471 and the second portion 472. The feeding element 460 is positioned on the second portion 472 of the dielectric substrate 470 and is adjacent to the protruding radiation element 440. A coupling gap GC3 is formed between the feeding element 460 and the protruding radiation element 440. The transmission line 480 includes a signaling conductor 481 and a grounding conductor 482. The signaling conductor 481 and the grounding conductor 482 are positioned on two opposite surfaces of the first portion 471 of the dielectric substrate 470, respectively, so as to form a microstrip line. A positive electrode of the signal source 190 may be coupled through the signaling conductor 481 to the first end 461 of the transmission line 460, and a negative electrode of the signal source 190 may be coupled to the grounding conductor 482. The grounding conductor 482 may further extend onto the second portion 472 of the dielectric substrate 470, and the grounding conductor 482 may be coupled to a shorting point GP on the protruding radiation element 440.

Figure 4D:
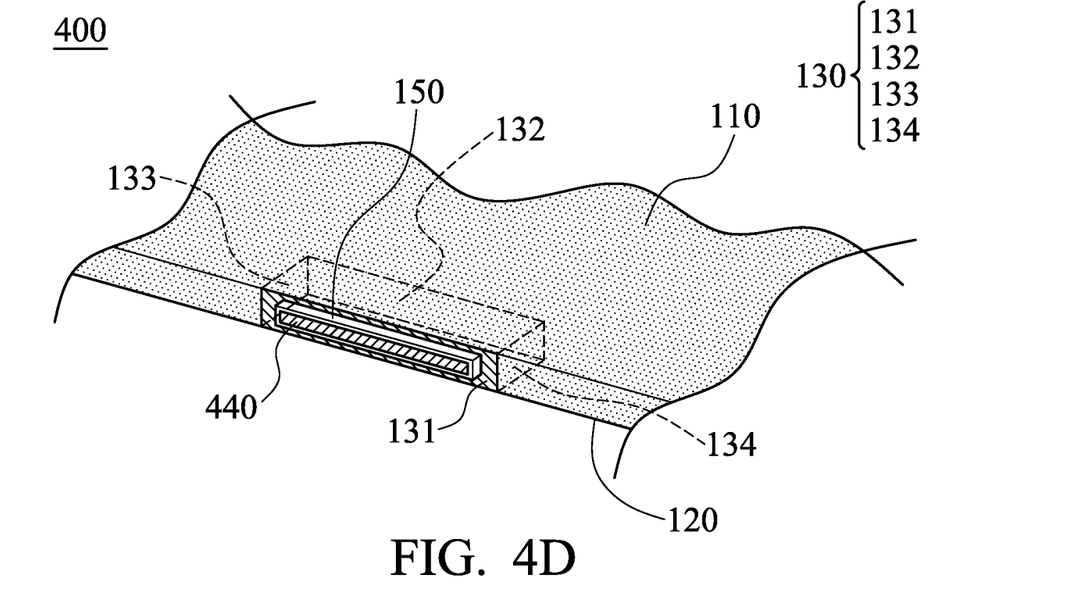
FIG. 4D is a partial perspective view of a mobile device according to an embodiment of the disclosure.

FIG. 4D is a partial perspective view of the mobile device 400 according to an embodiment of the disclosure. In the embodiment of FIG. 4D, the metal cavity structure 130 of the mobile device 400 further includes a first metal partition 133 and a second metal partition 134. The hollow portion of the metal cavity structure 130 is surrounded by the first metal partition 131, the second metal partition 132, the third metal partition 133, and the fourth metal partition 134. It should be noted that the total number of the aforementioned metal partitions and their positions are not limited in the disclosure.

Figure 4E:
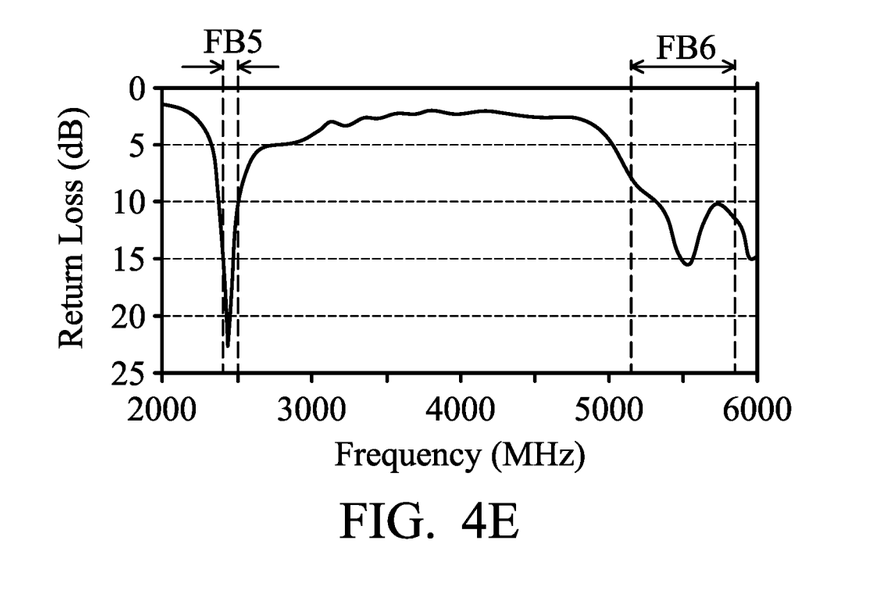
FIG. 4E is a diagram of return loss of an antenna structure of a mobile device according to an embodiment of the disclosure.

FIG. 4E is a diagram of return loss of the antenna structure of the mobile device 400 according to an embodiment of the disclosure. According to the measurement of FIG. 4E, the antenna structure of the mobile device 400 can cover a first frequency band FB5 from 2400 MHz to 2500 MHz, and a second frequency band FB6 from 5150 MHz to 5850 MHz. According to practical measurements, the radiation efficiency of the antenna structure of the mobile device 400 is about 42% or higher within the first frequency band FB5, and the radiation efficiency of the antenna structure of the mobile device 400 is about 57% or higher within the second frequency band FB6.

According to antenna theory, the protruding radiation element 440 can be excited to generate a fundamental resonant mode forming the first frequency band FB5, and the protruding radiation element 440 can be further excited to generate a higher-order resonant mode forming the second frequency band FB6 (double-frequency effect). The feeding element 460 can be independently excited to increase the operation bandwidth of the second frequency band FB6. In addition, the incorporation of the shorting point GP can fine-tune the impedance matching of the antenna structure of the mobile device 400.

The element sizes of the mobile device 400 may be as follows. The length L7 of the dielectric substrate 470 may be substantially equal to 0.18 wavelength of the first frequency band FB5. The length L8 of the protruding radiation element 440 may be substantially equal to 0.18 wavelength of the first frequency band FB5. The width of the coupling gap GC3 may be shorter than 0.5 mm (e.g., 0.4 mm). The above ranges of element sizes are calculated and obtained according to many experiment results, and they help to optimize the operation bandwidth and the impedance matching of the antenna structure of the mobile device 400. Other features of the mobile device 400 of FIG. 4A, FIG. 4B, FIG. 4C, and FIG. 4D are similar to those of the mobile device 100 of FIG. 1A, FIG. 1B, and FIG. 1C. Therefore, the two embodiments can achieve similar levels of performance.

The disclosure proposes a novel mobile device including an antenna structure. Since the antenna structure is adjacent to a host device of the mobile device, it does not occupy the space around the display frame and can meet the current design trend of narrow-border mobile devices. Furthermore, the main radiator of the antenna structure protrudes outside the mobile device in a design that can reduce interference and increase the radiation efficiency of the antenna structure. It should also be noted that the aesthetic appearance of the mobile device is improved because the antenna structure of the disclosure does not open any antenna window on the back cover of the mobile device. In conclusion, the disclosure has at least the advantages of small size, wide band, and beautiful device appearance, and it is suitable for application in a variety of mobile communication devices.

In some embodiments, this novel mobile device including the antenna structure of the disclosure can be a laptop, a wireless access point device, a mobile phone, etc. In some embodiments, the mobile device includes multiple antenna structures of the disclosure for Multi-input Multi-output (MIMO) configuration or omnidirectional radiation.

Note that the above element sizes, element shapes, and frequency ranges are not limitations of the disclosure. An antenna designer can fine-tune these settings or values according to different requirements. It should be understood that the mobile device and the antenna structure of the disclosure are not limited to the configurations of FIGS. 1-4. The disclosure may include any one or more features of any one or more embodiments of FIGS. 1-4. In other words, not all of the features displayed in the figures should be implemented in the mobile device and the antenna structure of the disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the disclosure. It is intended that the standard and examples be considered as exemplary only, with the true scope of the disclosed embodiments being indicated by the following claims and their equivalents.

What is claimed is:

1. A mobile device, comprising:
   a host upper cover;
   a host lower cover;
   a metal cavity structure, coupled between the host upper cover and the host lower cover, and comprising a first metal partition and a second metal partition, wherein the first metal partition has an opening;
   a protruding radiation element;
   a nonconductive connection element, connected to an edge of the opening of the first metal partition, wherein the nonconductive connection element is configured to support and surround the protruding radiation element; and
   a feeding element, coupled to a signal source, and disposed adjacent to the protruding radiation element;
   wherein an antenna structure is formed by the feeding element and the protruding radiation element;
   wherein the antenna structure covers a first frequency band and a second frequency band;
   wherein the protruding radiation element has a length that is substantially equal to 0.4 wavelength of the first frequency band.

2. The mobile device as claimed in claim 1, wherein the host upper cover and the host lower cover are made of metal materials.

3. The mobile device as claimed in claim 1, wherein the metal cavity structure is adjacent to an edge of the host upper cover and an edge of the host lower cover.

4. The mobile device as claimed in claim 3, wherein the first metal partition is aligned with the edge of the host upper cover and the edge of the host lower cover.

5. The mobile device as claimed in claim 1, wherein the protruding radiation element and the first metal partition are positioned on two different planes which are substantially parallel to each other, respectively.

6. The mobile device as claimed in claim 1, wherein the protruding radiation element has a vertical projection on the first metal partition, and the vertical projection is completely inside the opening.

7. The mobile device as claimed in claim 1, wherein the protruding radiation element substantially has a straight-line shape.

8. The mobile device as claimed in claim 1, wherein the feeding element substantially has a straight-line shape or an L-shape.

9. The mobile device as claimed in claim 1, wherein the first frequency band is from 2400 MHz to 2500 MHz, and the second frequency band is from 5150 MHz to 5850 MHz.

10. The mobile device as claimed in claim 9, further comprising:
    a transmission line, wherein the signal source is coupled through the transmission line to the feeding element.

11. The mobile device as claimed in claim 10, wherein the transmission line is a microstrip line.

12. The mobile device as claimed in claim 10, further comprising:
    a dielectric substrate, wherein the feeding element and the transmission line are disposed on the dielectric substrate.

13. The mobile device as claimed in claim 12, wherein the dielectric substrate has a right-angle bending portion.

14. The mobile device as claimed in claim 12, wherein a coupling gap is formed between the feeding element and the protruding radiation element.

15. The mobile device as claimed in claim 14, wherein the protruding radiation element is excited to generate a fundamental resonant mode forming the first frequency band, and the protruding radiation element is further excited to generate a higher-order resonant mode forming the second frequency band.

16. The mobile device as claimed in claim 12, further comprising:
    a via conductor, penetrating the dielectric substrate, wherein the feeding element is coupled through the via conductor to a feeding point on the protruding radiation element.

17. The mobile device as claimed in claim 16, wherein the transmission line comprises a signaling conductor and a grounding conductor, and the grounding conductor is coupled to a shorting point on the protruding radiation element.

18. The mobile device as claimed in claim 17, wherein the protruding radiation element comprises a first portion and a second portion, the feeding point is positioned between the first portion and the second portion, the first portion is excited to generate the first frequency band, and the second portion is excited to generate the second frequency band.

* * * * *